United States Patent [19]

Snyder

[11] Patent Number: 4,638,783
[45] Date of Patent: Jan. 27, 1987

[54] CARBURETION SYSTEM FOR ENGINES

[75] Inventor: Warren E. Snyder, Elm Grove, Wis.

[73] Assignee: Dresser Industries, Inc., Dallas, Tex.

[21] Appl. No.: 722,666

[22] Filed: Apr. 12, 1985

[51] Int. Cl.$^4$ ............................................. F02B 43/00
[52] U.S. Cl. ..................................... 123/527; 123/575; 123/27 GE; 48/180 R
[58] Field of Search ................ 123/527, 1 A, 440, 439, 123/575; 48/180.1

[56] References Cited

U.S. PATENT DOCUMENTS

| | | | |
|---|---|---|---|
| 1,089,478 | 3/1914 | Kasley | 123/527 |
| 2,682,866 | 7/1954 | Rhoades, Jr. | 123/527 |
| 2,744,511 | 5/1956 | Kaufmann et al. | 123/527 |
| 4,102,313 | 7/1978 | Laprade et al. | 123/440 |
| 4,364,364 | 12/1982 | Subramaniam | 123/527 |
| 4,417,558 | 11/1983 | Osuga et al. | 123/440 |
| 4,430,978 | 2/1984 | Lewis et al. | 123/527 |
| 4,513,728 | 4/1985 | Ullman et al. | 123/527 |
| 4,526,155 | 7/1985 | Van den Wildenberg et al. | 123/527 |
| 4,541,397 | 9/1985 | Young | 123/527 |

Primary Examiner—E. Rollins Cross

[57] ABSTRACT

An improved carburetion system for gaseous fueled, spark ignited, internal combustion engines that includes pressure regulating and sensing apparatus to vary or cause the variation of the fuel/air ratio to automatically compensate for changes in the heating value and chemical composition of fuels being burned in the engine.

16 Claims, 3 Drawing Figures

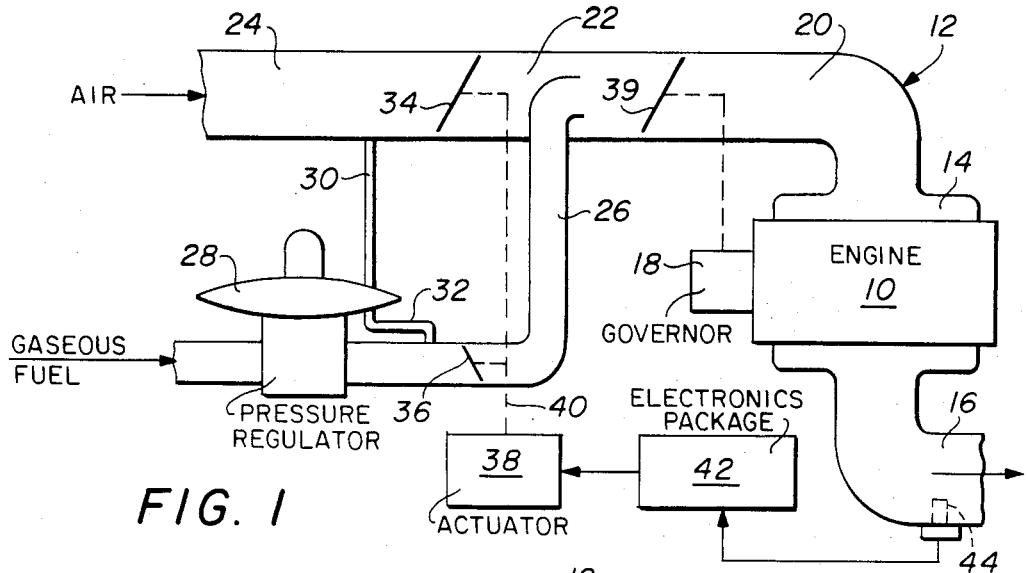
FIG. 1
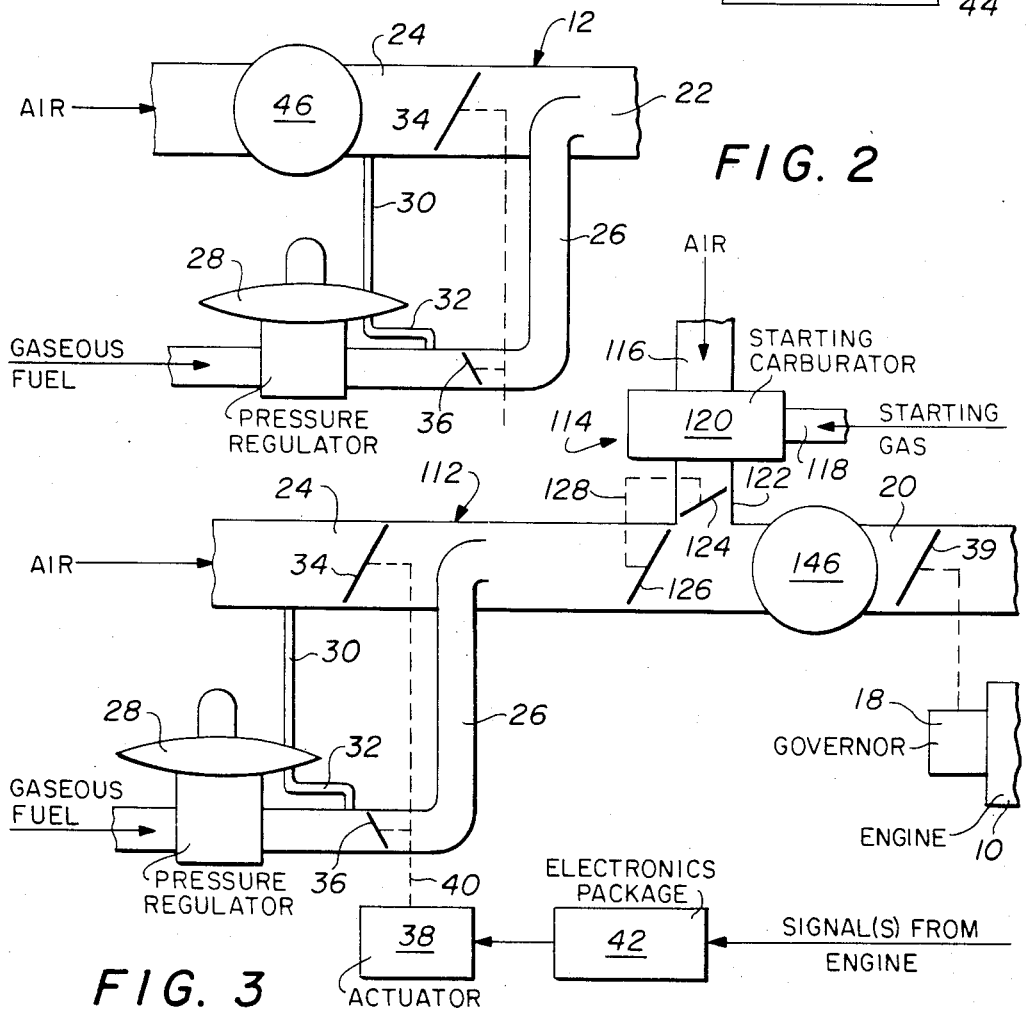
FIG. 2
FIG. 3

CARBURETION SYSTEM FOR ENGINES

BACKGROUND OF THE INVENTION

This invention relates generally to improved carburetion systems for spark ignited, gaseous fueled engines. More particularly, but not by way of limitation, this invention relates to an improved carburetion system for spark ignited gaseous fueled engines wherein the gaseous fuel has a wide range of heating values.

Over the past several years, due to the relative shortage of fuels having high heating values, it has become desirable to develop an engine that will efficiently utilize gaseous fuels having various heating values, as well as having various chemical compositions. Not only is it desirable that the engine efficiently burn such fuels, but it is highly desirable that such an engine be able to handle various mixtures of such gases. Also, the engine must be able to automatically compensate for the various gases during the operation of the engine.

U.S. Pat. No. 2,744,511, which issued May, 1956 to W. M. Kauffmann, et al, illustrates one attempt to provide a spark ignition internal combustion engine that will utilize gaseous fuels such as natural gas, sewer gas, manufactured gas, etc., while this ratio control system described in the '511 patent is capable of handling the various fuels, the patent indicates that such ratios are controlled in response to the temperature of the exhaust in the exhaust manifold. Utilizing the temperature as a measure will, of course, provide a basis for proportioning the air and fuel. However, it is believed that the utilization of an oxygen sensor provides a better indication of the desired air and fuel ratio for the combustion gases.

The gaseous fuel carburetors currently in use were designed for use with natural gas which has a nominal heating value of about 1000 BTU/FT3. Modifications to the carburetors have been made to permit utilization of fuels, such as sewer gas, having heating values in the range of 600 BTU/FT3. Presently, it is desirable to use gaseous fuels, such as those available from landfills, which have heating values as low as 100 BTU/FT3. To further complicate the carburetion problem, the landfill generated gaseous fuels at a single site may vary in heating value by about 200 BTU/FT3.

Accordingly, an object of this invention is to provide an improved carburetion system for spark ignited, gaseous fueled engines wherein fuels of widely varying heating values and chemical compositions can be readily accommodated and efficiently burned.

SUMMARY OF THE INVENTION

This invention then provides an improved carburetion system for spark ignited, gaseous fueled engines having an intake system and an exhaust system. The carburetion system comprises a fuel and air mixer having an outlet for connection to the intake system; a pressure regulated fuel supply that is connected to the mixer; and a common air supply connected to the mixer. A first valve in the air supply regulates the flow of air to the mixer and a second valve in the fuel supply regulates the flow of fuel to the mixer. Fuel and air control apparatus position the valves to decrease the fuel supply to the mixer while increasing the air supply to the mixer, and vice versa. A pressure regulator is provided for controlling the pressure of the fuel being supplied to the mixer to a value slightly below the pressure of the air being supplied to the mixer.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 1 is a schematic illustration of an engine that includes an improved carburetion system constructed in accordance with the invention.

FIG. 2 is a view similar to FIG. 1, but illustrating a modified form of carburetion system that is also constructed in accordance with the invention.

FIG. 3 is also a schematic view somewhat similar to FIG. 2, but illustrating a still further modification of carburetion system that is also constructed in accordance with the invention.

DETAILED DESCRIPTION OF THE PREFERRED EMBODIMENT

Referring to the drawing and to FIG. 1 in particular, shown therein and generally designated by the reference character 10, is an engine that incorporates a carburetion system 12 that is constructed in accordance with the invention. The engine 10 includes an intake manifold system 14, an exhaust system 16 and a governor 18 that is connected with the engine 10.

The carburetion system 12 includes an air/fuel conduit 20 that extends from a fuel mixer 22 to the intake manifold 14 of the engine 10. An air conduit 24 connects the mixer 12 with a source of air. The source of air, although not illustrated, may include suitable filters and the like.

Also connected with the mixer 22 is a fuel conduit 26 that connects the mixer 22 with a source of pressurized fuel gas (not shown). A pressure regulator 28 is located in the conduit 26 to control the pressure of the gaseous fuel.

The regulator 28 is connected by a sensing conduit 30 with the air conduit 24 upstream of the mixer 22. The regulator 28 is also connected either externally as illustrated, or internally within the regulator with a pressure feedback conduit 32 that senses the pressure in the gaseous fuel conduit 26 downstream of the pressure regulator. The regulator 28 is adjusted so that it maintains the pressure in the conduit 26 downstream thereof at a slightly lower value than the pressure in the air conduit 24.

With the regulator 28 interconnected with the air conduit 24 and gaseous fuel conduit 26, two advantages are provided. First, the regulator will close, shutting off the flow of gaseous fuel when the engine stops. Second, setting the gaseous fuel pressure slightly below the value of the air pressure causes the air/fuel mixture to become slightly rich upon an increase in engine load and to become slightly lean when the engine load decreases.

An air flow control valve 34 is located in the air conduit between the conduit 30 and the mixer 22. A second flow control valve 36 is located in the gaseous fuel conduit 26 between the pressure regulator 28 and the mixer 22. The valves 34 and 36 are arranged so that as one valve pivots toward the closed position, the other pivots toward the open position. Accordingly, if more air is required in the mixture, the valve 34 is moved toward the open position while the valve 36 is moved toward the closed position. Conversely, if a richer fuel mixture is required, the valve 36 is moved toward the open position while the valve 34 is moved toward the closed position.

As described above, the greatest variation in the air/fuel mixture is attained. However, the system can be simplified by utilizing a fixed orifice or manually adjustable valve, appropriately selected, to replace either of the valves 34 or 36. Such an arrangement may be successfully utilized when the range of fuel energy values is known, and thus the range of mixtures is known.

The positions of the valves 34 and 36 are controlled by an actuator 38 that is linked to the valves 34 and 36 (as illustrated by the dash lines 40). The actuator 38 receives signals from an electronic system 42 which is connected to an oxygen sensor 44 that is located in the exhaust manifold 16 of the engine 10.

A third flow control valve 39 is located in the fuel/air conduit 20 downstream of the mixer 22. The position of the valve 39 is controlled by the governor 18. The function of the valve 39 is to admit a larger or smaller volume of fuel/air mixture into the intake manifold 14, as required by the engine 14 to maintain a previously determined engine operating parameter. For example, the governor 18 positions the valve 39 to maintain the engine 10 operating at a substantially constant speed despite variations in the load imposed on the engine 10.

Assuming that the engine 10 is in operation, air is being supplied through the conduit 24 to the mixer 22 while gaseous fuel is being supplied through the regulator 28 and the gaseous fuel conduit 26 to the mixer 22. As previously mentioned, the valves 34 and 36 control the ratio of the air/fuel mixture in the mixer 22 while the valve 39 controls the volume or quantity of such mixture flowing into the engine 10.

The power requirements of the engine will, of course, be determined and the proper amount of fuel and air admitted to provide the necessary power. Should the heating value of the gaseous fuel change, an indication of such change is sensed by the oxygen sensor 44. The oxygen sensor 44 then transmits a signal indicative of such to the electronics system 42, which signals the actuator 38 to reposition the valves 34 and 36 to provide a different ratio of air/fuel to the engine 10. This assures that the proper air/fuel mixture is reaching the engine 10.

It will, of course, be apparent that should a different gaseous fuel be introduced, the valves 34 and 36 will be repositioned as necessary to provide the correct air/fuel mixture required by the engine 10. Thus, it should be apparent also that the system described can be utilized with fuels of various heating values and chemical content, and further that the system can provide the engine with the correct air/fuel mixture, even if the heating values of the fuels change while the engine 10 is in operation.

THE EMBODIMENT OF FIG. 2

FIG. 2 illustrates schematically, the carburetion system 12 as utilized in FIG. 1, but shown in combination with a turbocharger 46. The turbocharger 46 is illustrated as being located in the air conduit 24 upstream of the sensing conduit 30 and the valve 34. The arrangement is such that, when needed, the turbocharger 46 provides additional pressure to the air in the conduit 24 which also causes additional fuel pressure. The regulator 28 senses the relative pressures in the air conduit 24 and the gaseous fuel conduit 26 through the conduits 30 and 32 and increases the pressure of fuel in the conduit 26. Accordingly, if the engine power demand is such, the turbocharger 46 will provide the additional air/fuel pressure to provide, virtually instantaneously, the required air/fuel mixture to the engine 10.

THE EMBODIMENT OF FIG. 3

FIG. 3 illustrates a modified form of the carburetion system 12 which has been designated by the reference character 112. Most of the components utilized in the carburetion system 112 are the same as those utilized in the system 12 previously described. Therefore, those common parts will be designated by the same reference characters in FIG. 3 as they were in FIG. 1.

In the system of FIG. 3, it will be noted that the engine 10 is provided with the governor 18 which controls the air/fuel valve 39 that is disposed in the air/fuel conduit 20. Just upstream of the valve 39 is a turbocharger 146. In this position, the turbocharger 146 provides a boost in the volume and pressure of air/fuel flowing in the conduit 20.

Between the mixer 22 and the turbocharger 146, there is provided a starting carburetor 114 which includes an air inlet 116, a starting gas inlet 118, and a mixer 120, wherein the air in the inlet 116 and fuel in the conduit 118 are combined. A starting fuel conduit 122 connects the mixer 120 with the air/fuel conduit 20 upstream of the turbocharger 146, as previously mentioned.

Located in the conduit 122 is a flow valve 124 that is linked to a flow valve 126 that is located in the conduit 20. The linkage 128 between the valves 124 and 126 is arranged so that when the valve 124 is open, the valve 126 is essentially closed. On the other hand, if the valve 124 is closed, the valve 126 will be essentially open. It should also be pointed out that the starting carburetor 114 will have a preset ratio which will normally be rich as compared to the air/fuel ratio provided by the mixer 22.

The starting carburetion system 114 is not essential, but where it is desired to operate the engine 10 on extremely low heating value fuel, the engine 10 may be relatively difficult to start. Therefore, with the starting carburetion 114 provided with a high energy gas, the valves 124 and 126 can be arranged so that the engine receives the rich and more volatile starting fuel during the start-up period.

Once the engine 10 is operating, the linkage 128 can be actuated to close the valve 124 and open the valve 126, thus shutting off flow from the starting carburetor 114 and opening the flow from the mixer 22 into the air/fuel conduit 20. At this point, the carburetion system 112 takes over and operates as did the system 12 previously described.

The position of the turbochargers 46 and 146 and whether one should be used or not, will be determined by the operating characteristics of the engine and the application of the engine. Accordingly, it should be recognized that in the systems described, the turbocharger can be located where desired or required. Occasionally, the fuels to be utilized are at a low pressure and external compression is not desired.

The carburetion system described in connection with FIG. 3 has the advantage of being able to provide ease of engine starting, while at the same time permitting the engine to be operated by a fuel having an extremely low heating value. Also, and as described in connection with the embodiment of FIG. 1, the heating value of the fuels utilized can be changed during the operation of the engine and such change will be reflected by the adjustment of the valves 34 and 36 so that the proper air/fuel ratio is provided to the engine 10 to assure efficient operation of the engine.

It will be understood that the embodiments described in detail hereinbefore are presented by way of example only and that many changes and modifications can be made to the apparatus without departing from the spirit or scope of the invention.

What is claimed is:

1. An improved carburetion system for spark-ignited, gaseous fueled engines having an intake system and an exhaust system, said carburetion system comprising:
    a fuel and air mixer having an outlet for connection to said intake system;
    pressure regulated fuel supply means connected to said mixer;
    air supply means connected to said mixer;
    first valve means in said air supply means for regulating the flow of air to said mixer;
    second valve means in said fuel supply means for regulating the flow of fuel to said mixer;
    fuel and air control means for positioning said valve means to decrease the fuel supplied to said mixer while increasing the air supplied to said mixer and vice versa; and,
    pressure regulating means for controlling the pressure of said fuel being supplied to said mixer.

2. The carburetion system of claim 1 wherein said fuel and air control means includes sensing means for determining the content of said mixed air and fuel and for transmitting a signal indicative thereof to position at least one of said valve means.

3. The carburetion system of claim 2 wherein said sensing means includes a detector located in said exhaust system for sensing the oxygen content of said exhaust gases and transmitting a signal indicative thereof to position said valve means.

4. The carburetion system of claim 1 and also including a throttle valve means located downstream of said mixer in an air/fuel conduit for controlling the volume of mixed air and fuel supplied to said engine.

5. The carburetion system of claim 4 wherein said air supply means includes an air supply conduit connecting an air supply to said mixer and said system also includes a turbocharger located in said air supply conduit upstream of said mixer.

6. The carburetion system of claim 5 wherein said pressure regulating means includes:
    a pressure regulator located in a fuel supply conduit;
    first conduit means connecting said regulator to said air supply conduit between said turbocharger and said first valve means; and,
    second conduit means connecting said regulator to said fuel supply conduit between said regulator and second valve means whereby said regulator can compare the pressures in said air supply conduit and fuel supply conduit.

7. An improved carburetion system for spark-ignited, gaseous fueled engines having an intake system and an exhaust system, said carburetion system comprising:
    a fuel and air mixer having an outlet;
    an air/fuel conduit extending from said mixer outlet to said intake system;
    a turbocharger located in said air/fuel conduit;
    pressure regulated fuel supply means connected to said mixer;
    air supply means connected to said mixer;
    first valve means in said air supply means for regulating the flow of air to said mixer;
    second valve means in said fuel supply means for regulating the flow of fuel to said mixer;
    fuel and air control means for positioning said valve means to decrease the fuel supplied to said mixer while increasing the air supplied to said mixer and vice versa;
    and, pressure regulating means for controlling the pressure of said fuel being supplied to said mixer.

8. The carburetion system of claim 7 and including a throttle valve located downstream of said turbocharger in said air/fuel conduit for controlling the volume of air and fuel flowing to said engine.

9. The carburetion system of claim 8 and also including:
    a starting carburetor connected with a source of air and fuel and with said air/fuel conduit between said mixer and turbocharger by a starting conduit;
    third valve means in said starting conduit for controlling the flow of starting fuel/air mixture through starting conduit;
    fourth valve means in said air/fuel conduit between said mixer and the connection of said starting conduit with said air/fuel conduit for controlling the flow of air/fuel from said mixer through said air/fuel conduit; and,
    starting control means for simultaneously positioning said third and fourth valve means whereby said third valve means is open when said fourth valve means is closed and vice versa.

10. The carburetion system of claim 9 wherein said fuel and air control means includes sensing means for determining the oxygen content of said mixed air and fuel and for transmitting a signal indicative thereof to position said first and second valve means.

11. The carburetion system of claim 9 wherein said sensing means includes a detector located in said exhaust system for sensing the oxygen content of said exhaust gases and transmitting a signal indicative thereof to position said valve means.

12. An improved method of carburetting fuel for a spark ignited, gaseous fueled engine comprising the steps of:
    supplying air to a mixer;
    supplying gaseous fuel to the mixer;
    maintaining the pressures of the fuel flowing to the mixer at a value lower than the pressure of the air flowing to the mixer;
    controlling the volume of air flowing to the mixer relative to the volume of fuel flowing to the mixer in an inverse relationship;
    mixing said air and fuel; and, supplying said mixed air and fuel to said engine.

13. The method of claim 12 and also including the steps of:
    measuring the oxygen content of said air and fuel mixture; and,
    transmitting a signal indicative of the oxygen content to a controller for controlling the relative volume of air and fuel.

14. The method of claim 13 and also including the steps of:
    providing an additional mixture of fuel and air to said engine during starting; and,
    controlling the volume of said additional mixture relative to said first mentioned mixed air and fuel.

15. The method of claim 13 and including the additional step of pressurizing said air before said mixing step.

16. The method of claim 13 and including the additional step of pressurizing said mixed air and fuel.

* * * * *